US010151934B2

United States Patent
Iwamatsu

(10) Patent No.: US 10,151,934 B2
(45) Date of Patent: Dec. 11, 2018

(54) LENS BARREL CAPABLE OF ACCURATELY POSITIONING AND FIXING MAGNETIC SENSOR, IMAGE PICKUP APPARATUS, AND IMAGE BLUR CORRECTION DEVICE

(71) Applicant: CANON KABUSHIKI KAISHA, Tokyo (JP)

(72) Inventor: Junichiro Iwamatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 15/278,363

(22) Filed: Sep. 28, 2016

(65) Prior Publication Data

US 2017/0097516 A1 Apr. 6, 2017

(30) Foreign Application Priority Data

Oct. 2, 2015 (JP) .................. 2015-196782

(51) Int. Cl.
*G02B 27/64* (2006.01)
*G02B 7/10* (2006.01)
(Continued)

(52) U.S. Cl.
CPC ........... *G02B 27/646* (2013.01); *G02B 7/021* (2013.01); *G02B 7/023* (2013.01); *G02B 7/10* (2013.01); *H02K 11/215* (2016.01); *H02K 41/02* (2013.01); *H02K 41/0356* (2013.01); *H04N 5/23287* (2013.01); *G02B 7/102* (2013.01)

(58) Field of Classification Search
CPC .. H04N 5/2251; H04N 5/2253; H04N 5/2254; H04N 5/2257; H04N 5/23248; H04N 5/23258; H04N 5/23264; H04N 5/23287; H02K 11/215; H02K 41/02; H02K 41/0356; H02N 2/04; H02N 2/004; H02N 2/026; G02B 7/08; G02B 7/09; G02B 7/021; G02B 7/022; G02B 7/023; G02B 7/10; G02B 7/102; G02B 7/646; G02B 27/646; G03B 5/00; G03B 5/02; G03B 17/02; G03B 17/561; G03B 13/001
USPC ........ 359/554, 557, 696, 823, 824; 348/374; 396/55; 29/428
See application file for complete search history.

(56) References Cited

U.S. PATENT DOCUMENTS

2009/0251777 A1* 10/2009 Suzuki ................. G02B 27/646
359/554
2012/0188441 A1* 7/2012 Takizawa ............. H04N 5/2251
348/374

FOREIGN PATENT DOCUMENTS

JP 2008-065179 A 3/2008
JP 4921087 B2 4/2012

* cited by examiner

*Primary Examiner* — Mustak Choudhury
(74) *Attorney, Agent, or Firm* — Venable LLP

(57) ABSTRACT

A technique enabling accurate positioning of a flexible printed circuit board and a magnetic sensor to an image blur correction device. A lens holding section holds a correction lens in a manner movable in a first direction and a second direction orthogonal to the first direction. A Hall element is mounted on the flexible printed circuit board to detect change in magnetic field of a magnet provided in the lens holding section. A Hall element-holding section holds the Hall element. An area of the flexible printed circuit board where the Hall element is mounted is locked to the Hall element-holding section in a manner movable in the first direction in a state restricted in movement in the second direction. The Hall element is movable relative to the Hall element-holding section in the second direction, in a state restricted in movement in the first direction.

12 Claims, 6 Drawing Sheets

(51) Int. Cl.
*H04N 5/232* (2006.01)
*G02B 7/02* (2006.01)
*H02K 41/02* (2006.01)
*H02K 41/035* (2006.01)
*H02K 11/215* (2016.01)

LENS BARREL CAPABLE OF ACCURATELY POSITIONING AND FIXING MAGNETIC SENSOR, IMAGE PICKUP APPARATUS, AND IMAGE BLUR CORRECTION DEVICE

BACKGROUND OF THE INVENTION

Field of the invention

The present invention relates to a lens barrel that is mounted on an image pickup apparatus, such as a digital camera or a film camera, an image pickup apparatus equipped with the lens barrel, and an image blur correction device.

Description of the Related Art

Among image pickup apparatuses including a digital camera, a type that performs a zooming operation by changing the spacing between lens groups of a lens barrel in an optical axis direction has come into widespread use. In general, within the lens barrel, there are provided a shutter mechanism, a diaphragm mechanism, an image blur correction device, and the like, each of which moves in an optical axis direction according to the zooming operation, and a flexible printed circuit board is used as means for supplying electric power to an actuator that drives these.

Incidentally, the image blur correction device is provided with a Hall element for detecting the amount of movement of an image blur correction lens. The Hall element is mounted on the flexible printed circuit board for supplying electric power to the image blur correction device, and is positioned and fixed on a component part of the image blur correction device, together with the flexible printed circuit board.

In order to accurately detect the amount of movement of the image blur correction lens, it is important to fix the Hall element at a desired location. For this reason, the flexible printed circuit board and the Hall element are required to be properly fixed to the image blur correction device.

As a method of fixing the flexible printed circuit board to the image blur correction device, there has been proposed, for example, a technique in which the flexible printed circuit board is provided with a Hall element-mounting section on which the Hall element is mounted and two positioning holes for positioning the flexible printed circuit board with respect to the image blur correction device (technique to which the invention of Japanese Patent Publication No. 4921087 is related). In this technique, the flexible printed circuit board is positioned with respect to the image blur correction device by causing the positioning holes of the flexible printed circuit board to be engaged with respective positioning shafts provided on the image blur correction device, and the Hall element is fixed to the image blur correction device.

In the technique to which the invention of Japanese Patent Publication No. 4921087 is related, the flexible printed circuit board has its position restricted by being engaged with the image blur correction device, and the Hall element has its position restricted by being fixed to the image blur correction device. Therefore, the Hall element mounted on the flexible printed circuit board is positioned not only with respect to the flexible printed circuit board, but also with respect to the image blur correction device. In short, the Hall element has its position restricted by dual positioning means.

In positioning the Hall element, it is required to take into account a positional deviation due to a mounting error caused when the Hall element is mounted on the flexible printed circuit board, dimensional tolerances of fixing portions of the image blur correction device and the Hall element, dimensional tolerances of engaging portions of the flexible printed circuit board and of the image blur correction device, and so forth.

For example, a location where the Hall element and the image blur correction device are fixed to each other and a location where the flexible printed circuit board and the image blur correction device are engaged with each other is sometimes positioned further away from each other than required due to the above-mentioned factors causing the positional deviation. In this case, the length of a portion of the flexible printed circuit board, which is required to extend between the location of engagement of the flexible printed circuit board and the image blur correction device and the location of fixing of the Hall element to the image blur correction device becomes insufficient.

Therefore, if an attempt is made to forcefully fixing the Hall element to the image blur correction device because the Hall element does not reach the location where it is to be fixed to the image blur correction device, the Hall element or the fixing portion of the image blur correction device can be broken or unnecessary load is applied to the mounting portion of the flexible printed circuit board, causing separation of the Hall element.

On the other hand, if the length of the portion of the flexible printed circuit board becomes too long for a dimension between the location of engagement of the flexible printed circuit board and the image blur correction device and the location of fixing of the Hall element to the image blur correction device, this leads to floating or looseness of the flexible printed circuit board. In this case, there is a fear that the flexible printed circuit board can interfere with neighboring component parts during a zooming operation of the lens barrel and adversely affect the zooming operation.

SUMMARY OF THE INVENTION

The present invention provides a technique which makes it possible to accurately position and fix a flexible printed circuit board and a magnetic sensor to an image blur correction device without being affected by positional deviation of a component part.

In a first aspect of the present invention, there is provided a zoom-type lens barrel having an image blur correction device and configured to change photographing magnification by movement of a lens group between a retracted position and a shooting position in a direction of an optical axis direction, wherein the image blur correction device comprises a lens holding section configured to hold a correction lens that is provided on a plane orthogonal to the optical axis in a manner movable in a first direction and a second direction orthogonal to the first direction and corrects an image blur by moving, a flexible printed circuit board having a first magnetic sensor mounted thereon for detecting a change in a magnetic field of a magnet provided in the lens holding section, and a magnetic sensor-holding section configured to hold the first magnetic sensor, wherein an area of the flexible printed circuit board where the first magnetic sensor is mounted is locked with respect to the magnetic sensor-holding section in a manner movable in the first direction in a state restricted in movement in the second direction, and wherein the first magnetic sensor is held on the magnetic sensor-holding section in a manner movable in the second direction in a state restricted in movement in the first direction.

In a second aspect of the present invention, there is provided an image pickup apparatus including a zoom-type lens barrel having an image blur correction device and configured to change photographing magnification by movement of a lens group between a retracted position and a shooting position in a direction of an optical axis direction, wherein the image blur correction device comprises a lens holding section configured to hold a correction lens that is provided on a plane orthogonal to the optical axis in a manner movable in a first direction and a second direction orthogonal to the first direction and corrects an image blur by moving, a flexible printed circuit board having a first magnetic sensor mounted thereon for detecting a change in a magnetic field of a magnet provided in the lens holding section, and a magnetic sensor-holding section configured to hold the first magnetic sensor, wherein an area of the flexible printed circuit board where the first magnetic sensor is mounted is locked with respect to the magnetic sensor-holding section in a manner movable in the first direction in a state restricted in movement in the second direction, and wherein the first magnetic sensor is held on the magnetic sensor-holding section in a manner movable in the second direction in a state restricted in movement in the first direction.

In a third aspect of the present invention, there is provided an image blur correction device capable of correcting an image blur by moving a correction lens in a first direction orthogonal to an optical axis, comprising a detection sensor configured to detect a position of the correction lens in the first direction, a substrate having the detection sensor mounted thereon, a first restriction section configured to restrict movement of the detection sensor, and a second restriction section configured to restrict movement of the substrate, wherein the first restriction section restricts movement of the detection sensor in the first direction more than movement of the detection sensor in a second direction orthogonal to the optical axis and the first direction, and wherein the second restriction section restricts movement of the substrate in the second direction more than movement of the substrate in the first direction.

According to the invention, it is possible to accurately position and fix the flexible printed circuit board and the magnetic sensors with respect to the image blur correction device without being affected by positional deviation of a component part.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
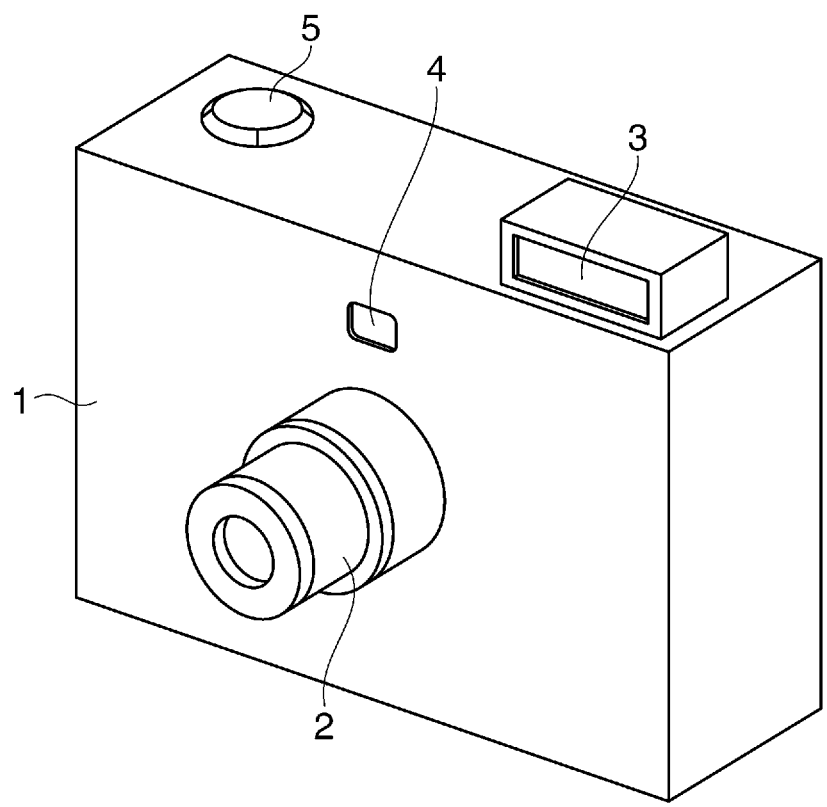
FIG. 1 is a perspective view of a digital camera, as viewed from a front side thereof, as an example of an image pickup apparatus equipped with a lens barrel according to an embodiment of the present invention.

FIG. 1 is a perspective view of a digital camera, as viewed from a front side (object side) thereof, as an example of an image pickup apparatus equipped with a lens barrel according to the embodiment.

As shown in FIG. 1, the digital camera of the present embodiment has a camera body 1. On the front side of the camera body 1, there is provided a zoom-type lens barrel 2 whose lens groups move in an optical axis direction between a retracted position and a shooting position to change a zoom magnification, and at a location upward of the lens barrel 2, there is formed a finder window 4.

On the upper surface of the camera body 1, there are provided a pop-up strobe unit 3, a release button 5, and so forth. When the release button 5 is half pressed, a photographing preparation operation (focus adjustment, photometry, and so forth) is started, and when the release button 5 is fully pressed, a photographing operation (exposure of an image sensor (image pickup device) to light) is started.

Figure 2:
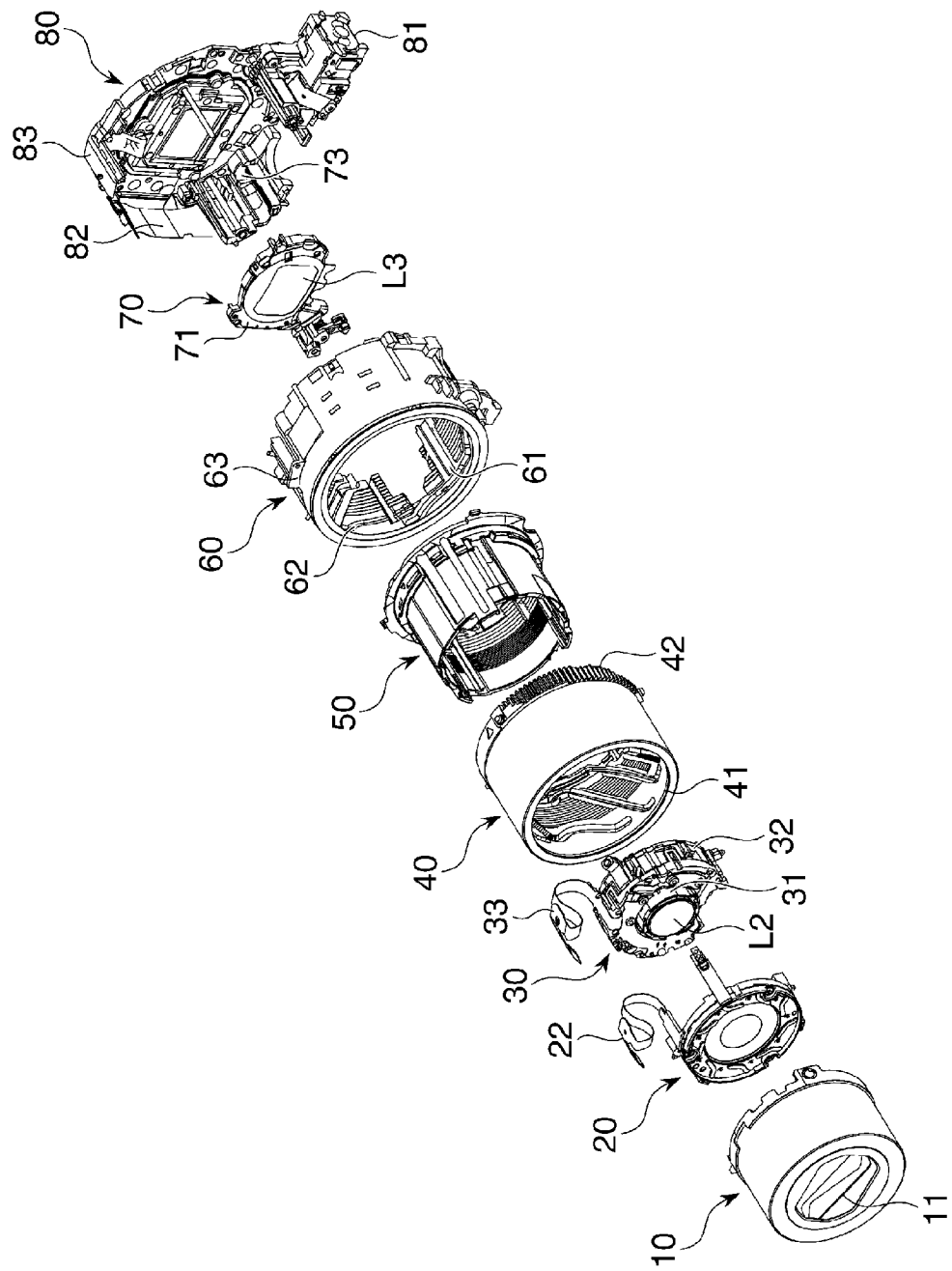
FIG. 2 is an exploded perspective view of the lens barrel.

FIG. 2 is an exploded perspective view of the lens barrel 2. As shown in FIG. 2, the lens barrel 2 is comprised of a first-group barrel 10, a diaphragm mechanism 20, a second-group barrel 30, a movable cam barrel 40, a rectilinear motion barrel 50, a fixed barrel 60, a third-group barrel 70, a sensor holder 80, a barrel drive motor 81, and a barrel flexible printed circuit board 82.

The first-group barrel 10 holds a first group lens, not shown, and has a front end thereof provided with a lens barrier device 11 for opening/closing a photographic optical path according to the power on/off of the camera. The diaphragm mechanism 20 includes a diaphragm unit (light amount adjustment unit), and adjusts the amount of light entering the first group lens to be guided into the image pickup device. The diaphragm mechanism 20 is provided with a diaphragm flexible printed circuit board 22 (hereinafter simply referred to as the diaphragm FPC 22).

The second-group barrel 30 has a second-group lens holding section 31 that holds a second group lens L2 serving as a correction lens. The second-group lens holding section 31 is supported on an anti-shake base plate 32 in a manner movable in a direction orthogonal to the optical axis, and forms a component of an image blur correction device. The anti-shake base plate 32 is provided with a shutter flexible printed circuit board 33 (hereinafter simply referred to as the shutter FPC 33), and on an imaging surface side of the anti-shake base plate 32, there is mounted a shutter mechanism. Note that the image blur correction device will be described in detail hereinafter.

The movable cam barrel 40 has an inner periphery thereof formed with cam grooves 41 for allowing the first-group barrel 10, the diaphragm mechanism 20, and the second-group barrel 30 to move in the optical axis direction, and an outer periphery thereof formed with a gear section 42 for transmitting a driving force from the barrel drive motor 81. The rectilinear motion barrel 50 is rotatably bayonet-coupled to the movable cam barrel 40, and moves in the optical axis direction in unison with the movable cam barrel 40 in a state in which rotation thereof is restricted by a rectilinear motion groove 61 formed in the inner periphery of the fixed barrel 60.

Each of the first-group barrel 10, the diaphragm mechanism 20, and the second-group barrel 30 individually or separately moves in the optical axis direction while following an associated one of the cam grooves 41 formed in the inner periphery of the movable cam barrel 40, and rotation thereof is restricted by the rectilinear motion barrel 50. In the inner periphery of the fixed barrel 60, there are formed a cam groove 62 for driving the movable cam barrel 40 and the rectilinear motion groove 61 for restricting the rotation of the rectilinear motion barrel 50. Further, the fixed barrel 60 has an outer periphery thereof formed with a flange 63 protruding radially outward.

The third-group barrel 70 has a third-group lens holding section 71 for holding a third group lens L3 serving as a focus lens. The third-group lens holding section 71 is moved in the optical axis direction by a driving force of a focus drive section 73, whereby a focusing operation is performed. The sensor holder 80 holds the image pickup device implemented e.g. by a CCD sensor or a CMOS sensor, and is coupled to the fixed barrel 60 in the optical axis direction.

In the outer periphery of the sensor holder 80, there is formed a wall 83 extending in the optical axis direction toward an object side. The barrel flexible printed circuit board 82 (hereinafter simply referred to as the barrel FPC 82) is connected to the diaphragm FPC 22 and the shutter FPC 33 by respective connectors, not shown, on the outer periphery-side of the fixed barrel 60.

Figure 3A:
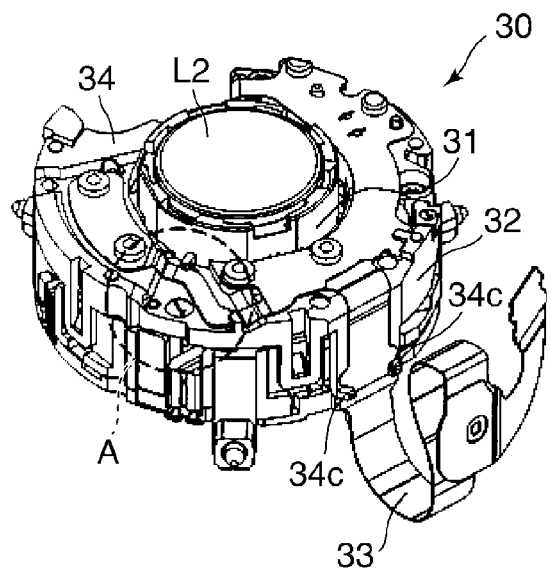
FIG. 3A is a perspective of a second-group lens barrel as viewed from an object side.
Figure 3B:
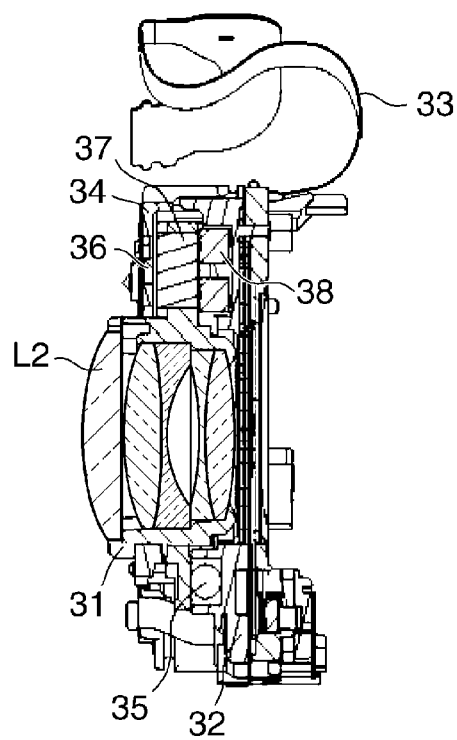
FIG. 3B is a cross-sectional view of the second-group lens barrel shown in FIG. 3A.

Next, a description will be given, with reference to FIGS. 3A and 3B, of the image blur correction device. FIG. 3A is a perspective view of the second-group barrel 30 as viewed from the object side, and FIG. 3B is a cross-sectional view of the second-group barrel 30 shown in FIG. 3A. On the outer periphery side of the anti-shake base plate 32, there is provided a lens drive section, not shown, for moving the second-group lens holding section 31 holding the second group lens L2 as the correction lens in a direction orthogonal to the optical axis direction. On the outer periphery side of the anti-shake base plate 32 at a location corresponding to the second group lens L2, there is provided a shutter drive section, not shown, for driving the shutter mechanism, and on the imaging surface side of the anti-shake base plate 32, there is provided an ND drive section, not shown, for driving an ND filter.

The second-group lens holding section 31 and the anti-shake base plate 32 are connected to each other by two tension springs, not shown, in the optical axis direction. The second-group lens holding section 31 is biased toward the anti-shake base plate 32 by the urging forces of the respective two tension springs with balls 35 interposed therebetween in the optical axis direction. The second-group lens holding section 31 holding the second group lens L2 is moved by rolling of the balls 35 in a direction orthogonal to the optical axis direction.

On the object side of the anti-shake base plate 32, a Hall element holding portion 34 is held in locking engagement with the anti-shake base plate 32 by snap-fit coupling. The shutter FPC 33 is routed on the Hall element holding portion 34 in a state connected to the lens drive section, the shutter drive section, and the ND drive section, and leads out toward the imaging surface side along a lead-out surface of the outer periphery of the Hall element holding portion 34. In an imaging surface-side edge of the lead-out surface of the Hall element holding portion 34, there are provided position restricting portions 34c for restricting the lateral motion of the shutter FPC 33. The Hall element holding portion 34 is an example of a magnetic sensor-holding section of the present invention.

Further, in an A area in FIG. 3A, an object-side surface of the Hall element holding portion 34 has a recess formed therein which opens toward the object side. An actuator, not shown, of the diaphragm mechanism 20 located on the object side of the second-group barrel 30 is configured to enter the recess in the retracted state of the lens barrel 2, which contributes to reduction of the thickness of the lens barrel 2 in the retracted state, and in turn, reduction of the thickness of the camera body 1.

On the shutter FPC 33, there are mounted two Hall elements 36 for detecting the position of the second group lens L2, in a manner circumferentially spaced from each other by 90°. Each of the Hall elements 36 is connected to the barrel FPC 82 via the shutter FPC 33. The Hall elements 36 are an example of magnetic sensors of the present invention.

Further, an object-side surface of the shutter FPC 33 is lined with a reinforcement lining material, but between the two Hall elements 36, there is formed an area where the lining material is partially removed. The shutter FPC 33 is fixed to the Hall element holding portion 34, and the Hall element holding portion 34 is held in locking engagement with the anti-shake base plate 32, with the second group lens L2 interposed therebetween, by snap-fit coupling.

In the second-group lens holding section 31, there are provided magnets 37 magnetized such that each of the Hall elements 36 is sandwiched by N pole and S pole of thereof, and magnetic fields that pass through the magnets 37 are detected as outputs from the Hall elements 36 by a controller of the camera body 1. When the second-group lens holding section 31 moves, the magnetic fields that pass through the Hall elements 36 change, thereby changing the outputs from the Hall elements 36. This makes it possible to detect the position of the second-group lens holding section 31.

Further, at a location opposed in the optical axis direction to each of the magnets 37, on the imaging surface side thereof, there is disposed a coil 38. The coil 38 is mounted to the anti-shake base plate 32. The coil 38 is connected to the barrel FPC 82 via the shutter FPC 33, whereby electric power is supplied thereto from a power source of the camera body 1. When the coil 38 is energized, an electromagnetic force is generated, which makes it possible to drive the second-group lens holding section 31.

Figure 4:
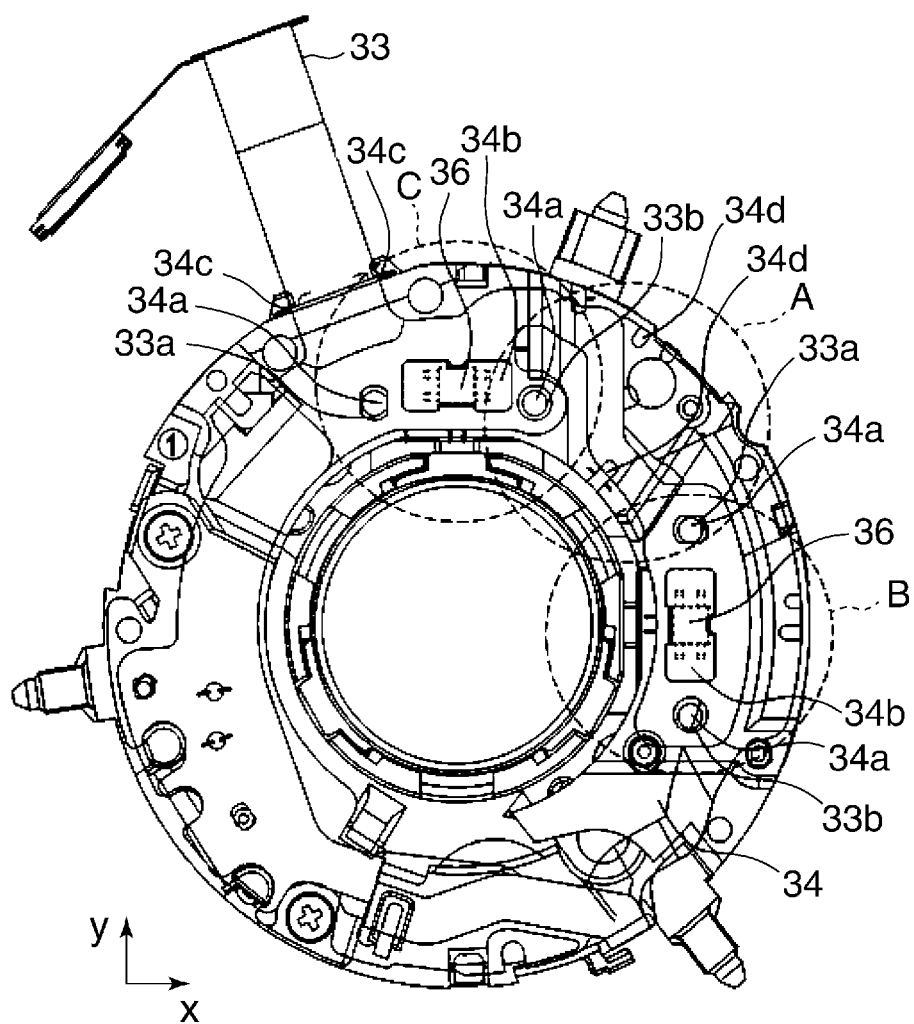
FIG. 4 is a view of a shutter flexible printed circuit board in a state mounted in a Hall element-holding section, as viewed from the object side in an optical axis direction.
Figure 5A:
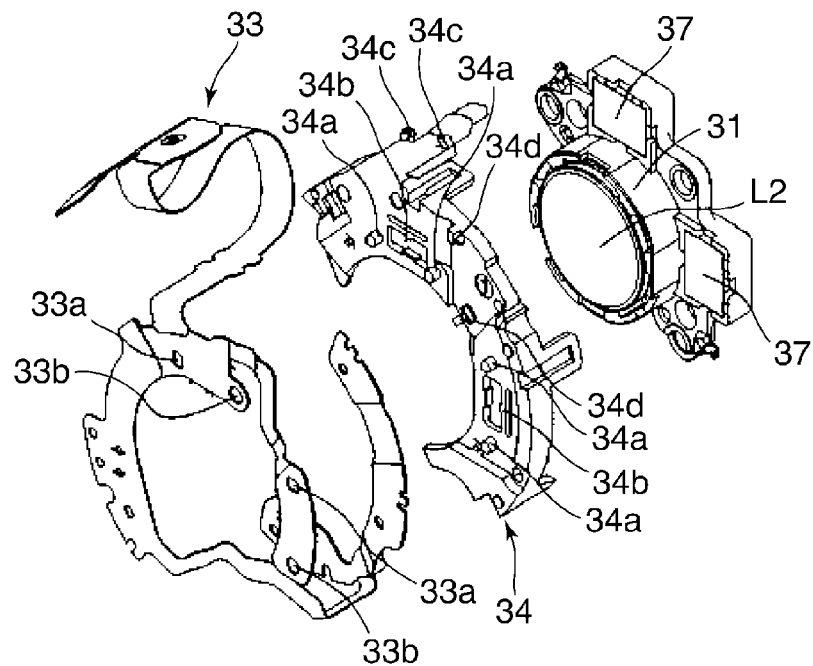
FIG. 5A is an exploded perspective view showing the shutter flexible printed circuit board, the Hall element-holding section, and a lens holding section.
Figure 5B:
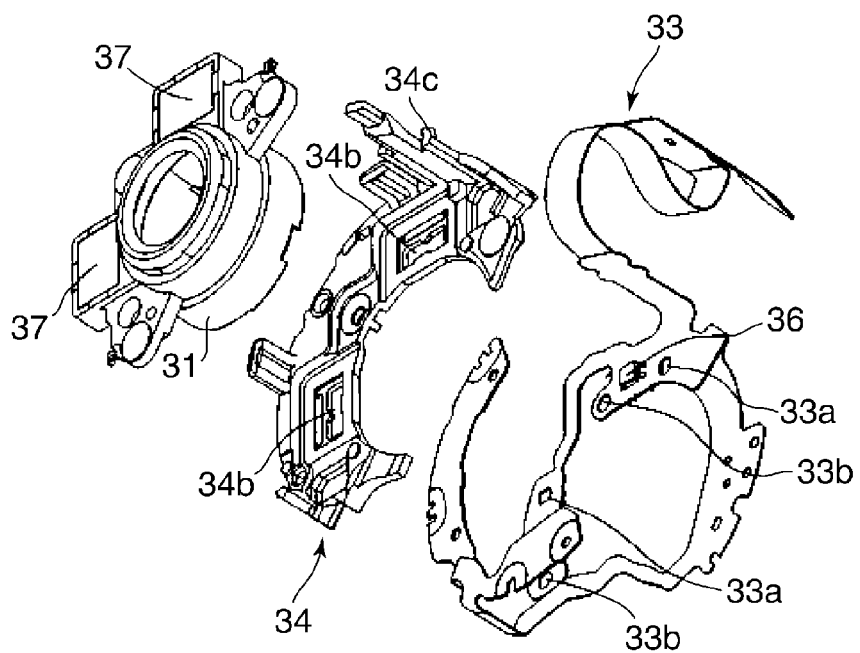
FIG. 5B is an exploded perspective view as viewed from an opposite side of FIG. 5A.

Next, a description will be given, with reference to FIGS. 4, 5A, and 5B, of a method of fixing the shutter FPC 33. FIG. 4 is a view of the shutter FPC 33 in a state mounted in the Hall element-holding section 34, as viewed from the object side in the optical axis direction. FIG. 5A is an exploded perspective view showing the shutter FPC 33, the Hall element-holding section 34, and the second-group lens holding section 31, and FIG. 5B is an exploded perspective view as viewed from an opposite side of FIG. 5A.

As described hereinbefore, the two Hall elements 36 for detecting the position of the second group lens L2 are mounted on the shutter FPC 33 in a manner circumferentially spaced from each other by 90°. One of the Hall elements 36, which is disposed in a B area in FIG. 4, is used to detect the position of the second-group lens holding section 31 in an x-axis direction, and the other of the Hall elements 36, which is disposed in a C area in FIG. 4, is used to detect the position of the second-group lens holding section 31 in a y-axis direction.

The Hall element 36 disposed in the B area corresponds to an example of a first magnetic sensor of the present invention, and the Hall element 36 disposed in the C area corresponds to an example of a second magnetic sensor of the present invention. Further, the x-axis direction corresponds to a first direction of the present invention, and the y-axis direction corresponds to a second direction of the present invention.

Incidentally, each of the Hall elements 36 is required to be fixed in a proper position for accurate detection of the amount of movement of the second-group lens holding section 31 in the x-axis direction or in the y-axis direction. However, when the Hall elements 36 are mounted on the shutter FPC 33, positional deviation can occur. When the position of each Hall element 36 deviates from the proper position on the shutter FPC 33, the amount of movement of the second-group lens holding section 31 cannot be accurately detected, which results in erroneous detection of an image blur correction amount.

In the present embodiment, erroneous detection of the image blur correction amount is prevented as follows: In the Hall element-holding section 34, locking shafts 34a for restricting the position of the shutter FPC 33 are disposed in each of the areas B and C at respective locations opposed to each other via an associated one of the Hall elements 36. Further, the shutter FPC 33 is formed with locking holes 33a and 33b for engagement with the respective locking shafts 34a.

In the B area in FIG. 4, the locking hole 33a is formed into a slot shape elongated in the x-axis direction, and therefore the locking shaft 34a and the locking hole 33a have predetermined free space therebetween in the x-axis direction, but no free space in the y-axis direction so that the position of the locking hole 33a is restricted in the y-axis direction. This makes the shutter FPC 33 movable in the x-axis direction but restricted from moving in the y-axis direction with respect to the Hall element-holding section 34.

As for the locking shaft 34a and the locking hole 33b, the locking hole 33b is formed to have a hole diameter larger than the diameter of the locking shaft 34a, which allows backlash or play of the shutter FPC 33 with respect to the Hall element-holding section 34.

Further, in the Hall element-holding section 34, there is provided a locking portion 34b for restricting the position of the Hall element 36. The Hall element 36 disposed in the B area in FIG. 4 is engaged with the locking portion 34b by light press-fitting, and the position of the Hall element 36 is restricted in the x-axis direction, but not in the y-axis direction. This makes the Hall element 36 mounted on the shutter FPC 33 restricted from moving in the x-axis direction but movable in the y-axis direction with respect to the Hall element-holding section 34.

This is for the purpose of restricting the Hall element 36 to a desired position so as to properly detect the amount of movement of the second-group lens holding section 31 in the x-axis direction. Thus, the Hall element 36 has its position in the x-axis direction determined by the Hall element-holding section 34, and its position in the y-axis direction determined by the shutter FPC 33.

Now, a description will be given of a case where the Hall element 36 in the B area in FIG. 4 has positionally deviated with respect to the shutter FPC 33 in each of the x-axis direction and the y-axis direction due to a manufacturing error or a mounting error of a component part.

First, in a case where a positional deviation due to a mounting error of the Hall element 36 with respect to the shutter FPC 33 in the x-axis direction occurs, the position of the Hall element 36 in the x-axis direction is restricted by the Hall element-holding section 34. Further, the shutter FPC 33 is locked on the Hall element-holding section 34 by the two locking holes 33a and 33b in a manner movable in the x-axis direction.

Therefore, a location where the Hall element 36 and the Hall element-holding section 34 are fixed to each other and a location where the shutter FPC 33 and the Hall element-holding section 34 are engaged with each other move relative to each other in the x-axis direction, whereby positional deviation due to the mounting error is accommodated. Thus, a fear that unnecessary load is applied to the portion of the shutter FPC 33 where the Hall element 36 is mounted is eliminated.

On the other hand, in a case where mounting displacement of the Hall element 36 with respect to the shutter FPC 33 in the y-axis direction occurs, the Hall element 36 has its position in the x-axis direction restricted by the Hall element-holding section 34 without having its position in the y-axis direction restricted.

The locking holes 33a and 33b of the shutter FPC 33 are engaged with the respective locking shafts 34a of the Hall element-holding section 34, but since the locking hole 33b is loosely fitted on the locking shaft 34a with the predetermined free space, even when a manufacturing error of any of the relevant component part occurs, it is possible to accommodate a positional deviation caused by the manufacturing error.

In a case where a positional deviation due to a mounting error of the Hall element 36 with respect to the shutter FPC 33 occurs, the position of the shutter FPC 33 in the y-axis direction is restricted by the locking shaft 34a of the Hall element-holding section 34. This causes the positional deviation of the Hall element 36 with respect to the locking portion 34b of the Hall element-holding section 34 in the y-axis direction. However, the Hall element 36 in the B area in FIG. 4 is provided for detection of the position of the second-group lens holding section 31 in the x-axis direction, and hence the positional deviation of the Hall element 36 in the y-axis direction has little influence on the detection accuracy.

This makes it possible to properly restrict the position of the Hall element 36 in the B area in FIG. 4 in the x-axis direction which is a detecting direction of the second-group lens holding section 3, and further, even when a positional deviation is caused by a manufacturing error or a mounting error of any of the relevant component parts, it is possible to accommodate the positional deviation.

The above also applies to the Hall element 36 in the C area in FIG. 4. More specifically, the position of the Hall element 36 disposed in the C area in FIG. 4 can be correctly restricted in the y-axis direction which is a detecting direction of the second-group lens holding section 31, and further, even when a positional deviation is caused by a manufacturing error or a mounting error of any of the relevant component parts, it is possible to accommodate the positional deviation. Therefore, it is possible to suppress separation of the Hall element 36 from the shutter FPC 33 and defective assembly.

Figure 6:
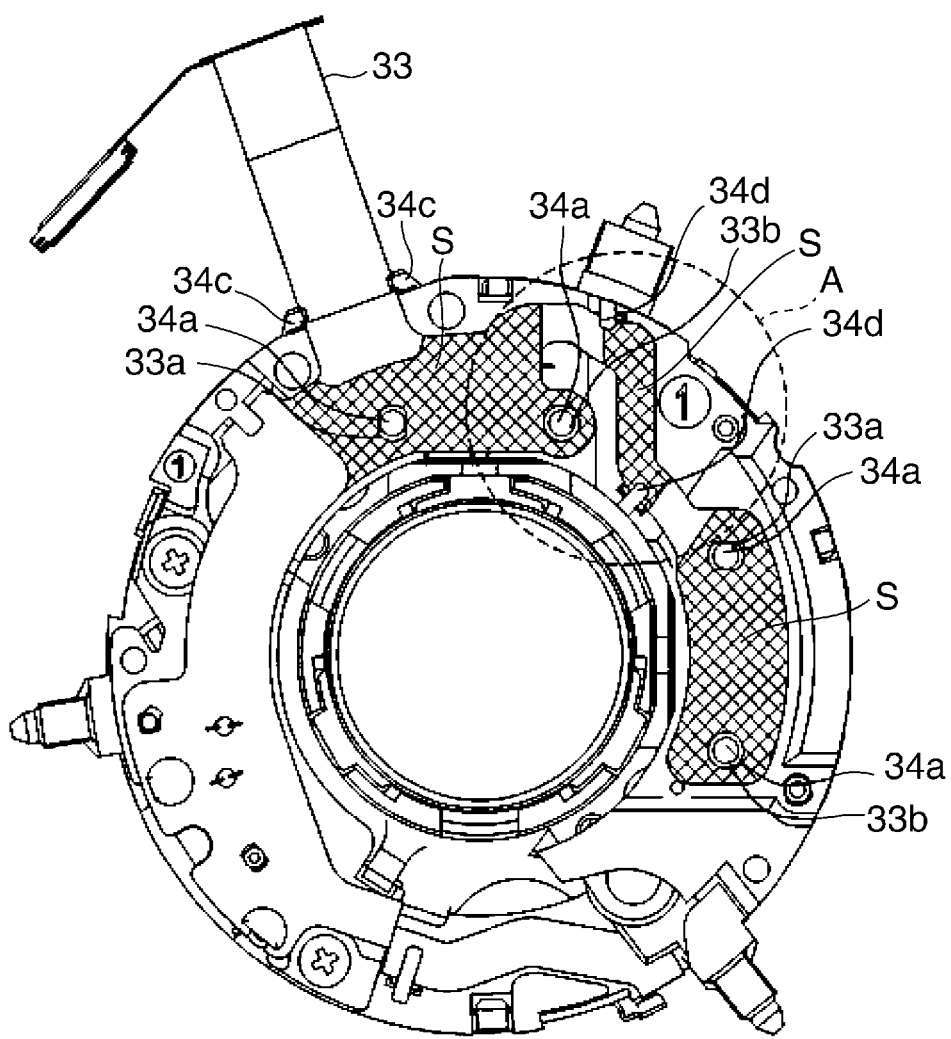
FIG. 6 is a view useful in explaining a reinforcement lining material provided on the shutter flexible printed circuit board.

Next, a description will be given, with reference to FIGS. 4 to 6, of the positional relationship between the locking holes 33a and 33b of the shutter FPC 33. FIG. 6 is a view useful in explaining the reinforcement lining material of the shutter FPC 33. In FIG. 6, areas S are portions of the shutter FPC 33 which are lined with the lining material.

First, the positional relationship between the locking holes 33a and 33b in the B area in FIG. 4 will be explained. As described hereinbefore, in the retracted state of the lens barrel 2, the actuator, not shown, of the diaphragm mechanism 20 enters the recess formed in the A area of the Hall element-holding section 34 in FIG. 4 to be close to the Hall element-holding section 34.

Therefore, the shutter FPC 33 is laid out on the Hall element-holding section 34 in a manner routed along the recess. As a consequence, a step height of the recess of the Hall element holding portion 34 causes a resilient force to be generated in the shutter FPC 33, which can be a cause of floating of the shutter FPC 33. Therefore, it is necessary to suppress floating of the shutter FPC 33 from the recess.

To this end, in the present embodiment, so as to reduce the resilient force of the shutter FPC 33 generated by the step height of the recess of the Hall element-holding section 34, portions of the shutter FPC 33 corresponding to steps of opposite ends of the recess are not lined with the lining material but an area of the shutter FPC 33 between the portions is lined with the lining material, as shown in FIG. 6.

This causes the shutter FPC 33 to be pressed on the bottom surface of the recess, and even when floating occurs, the amount of floating is minimized by floating restricting portions 34d of the Hall element-holding section 34.

Further, in order to fixedly hold the shutter FPC 33 in the recess of the Hall element-holding section 34, the locking hole 33a for restricting the position of the shutter FPC 33 in the y-axis direction is disposed at a location in the B area closer to the A area, and the locking hole 33b having free space with respect to the locking shaft 34a is disposed at a location remote from the A area. Then, the locking holes 33a and 33b are locked on the respective locking shafts 34a of the Hall element-holding section 34, whereby the position of the shutter FPC 33 is restricted.

Thus, the shutter FPC 33 in the A area is positionally restricted in the vicinity of the A area, so that the amount of play in the vicinity of the A area in a direction parallel to a plane orthogonal to the optical axis is reduced in comparison with a case where the locking hole 33b is disposed at a location close to the A area.

Accordingly, the shutter FPC 33 in the vicinity of the A area can have a length close to a predetermined length, so that it is possible to reduce the possibility of the shutter FPC 33 being unnecessarily loosened or the length of the shutter FPC 33 becoming insufficient, and hence it is possible to cause the shutter FPC 33 to be routed along the recess of the Hall element-holding section 34.

Next, a description will be given of the positional relationship between the locking holes 33a and 33b in the C area in FIG. 4. If the shutter FPC 33 positionally deviates on a plane orthogonal to the optical axis in the vicinity of the lead-out surface of the Hall element-holding section 34, the position of the shutter FPC 33 in the lateral direction cannot be determined by the position restricting portions 34c.

Further, if the position of the shutter FPC 33 is not correctly restricted by the position restricting portions 34c, the shutter FPC 33 can be warped in the thickness direction or be moved onto the position restricting portion 34c. In such a case, there is a fear that the shutter FPC 33 can be brought into contact with an neighboring component part during zooming operation or that when the lens barrel 2 is being retracted into the retracted position, the shutter FPC 33 can be held between component parts of the lens barrel 2 to be broken or damage the component parts.

To avoid this, in the present embodiment, the shutter FPC 33 is formed with the locking hole 33a which is positionally restricted in the x-axis direction, at a location close to the lead-out surface of the Hall element-holding section 34 toward the imaging surface side in the optical axis direction, and is formed with the locking hole 33b having free space with respect to the locking shaft 34a, at a location remote from the lead-out surface.

This makes it possible to restrict the position of the shutter FPC 33 in a direction parallel to the plane orthogonal to the optical axis, at a location closer to the portion of the shutter FPC 33 leading out to the imaging surface side in the optical direction. The shutter FPC 33 positionally restricted with respect to the Hall element-holding section 34 is fixedly joined to the Hall element-holding section 34 by fusing the locking shaft 34a by thermal caulking.

As described above, in the present embodiment, it is possible to correctly restrict the position of the Hall element 36 in the detecting direction of the second-group lens holding section 31. Further, even when a positional deviation is caused by a manufacturing error or a mounting error of any of the relevant component part, it is possible to accommodate the positional deviation. Therefore, it is possible to suppress separation of the Hall element 36 from the shutter FPC 33 and defective assembly.

Further, in the present embodiment, the position of the shutter FPC 33 is appropriately restricted due to the positional relationship between the locking holes 33a and 33b and the locking shafts 34a of the Hall element-holding section 34. This prevents the shutter FPC 33 from adversely affecting zooming operation or from being held between component parts of the lens barrel 2 to be broken or damage the component parts when the lens barrel 2 is being retracted into the retracted position. This makes it possible to accurately position and fix the shutter FPC 33 and the Hall elements 36 with respect to the image blur correction device without being influenced by positional deviation of component parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-196782 filed Oct. 2, 2015 which is hereby incorporated by reference herein in its entirety.

What is claimed is:

1. A zoom-type lens barrel having an image blur correction device and being configured to change photographing magnification by movement of a lens group between a retracted position and a shooting position in a direction of an optical axis direction, wherein the image blur correction device comprises:
   a lens holding section configured to hold a correction lens that is provided on a plane orthogonal to the optical axis in a manner movable in a first direction and a second direction orthogonal to the first direction and that corrects an image blur by moving;
   a flexible printed circuit board having a first magnetic sensor mounted thereon for detecting a change in a magnetic field of a magnet provided in said lens holding section; and
   a magnetic sensor-holding section configured to hold said first magnetic sensor,
   wherein an area of said flexible printed circuit board where said first magnetic sensor is mounted is locked with respect to said magnetic sensor-holding section in a manner movable in the first direction in a state restricted in movement in the second direction, and wherein said first magnetic sensor is held on said magnetic sensor-holding section in a manner movable in the second direction in a state restricted in movement in the first direction.

2. The lens barrel according to claim 1, wherein said flexible printed circuit board has a second magnetic sensor mounted thereon in a manner circumferentially spaced from said first magnetic sensor, said second magnetic sensor being held on said magnetic sensor-holding section,
wherein an area of said flexible printed circuit board where said second magnetic sensor is mounted is locked with respect to said magnetic sensor-holding section in a manner movable in the second direction in a state restricted in movement in the first direction, and
wherein said second magnetic sensor is held on said magnetic sensor-holding section in a manner movable in the first direction with movement in a state restricted in movement in the second direction.

3. The lens barrel according to claim 2, wherein an area of said flexible printed circuit board between said first magnetic sensor and said second magnetic sensor has a reinforcement lining material partially removed therefrom.

4. The lens barrel according to claim 2, wherein said flexible printed circuit board leads out from an outer periphery of said magnetic sensor-holding section toward an imaging surface side in the direction of the optical axis, and a portion of the area of said flexible printed circuit board where said second magnetic sensor is mounted, of which movement in the first direction is restricted, is located close to a portion, leading out to the imaging surface side, of said flexible printed circuit board.

5. An image pickup apparatus including a zoom-type lens barrel having an image blur correction device and being configured to change photographing magnification by movement of a lens group between a retracted position and a shooting position in a direction of an optical axis direction, wherein the image blur correction device comprises:
a lens holding section configured to hold a correction lens that is provided on a plane orthogonal to the optical axis in a manner movable in a first direction and a second direction orthogonal to the first direction and corrects an image blur by moving;
a flexible printed circuit board having a first magnetic sensor mounted thereon for detecting a change in a magnetic field of a magnet provided in said lens holding section; and
a magnetic sensor-holding section configured to hold said first magnetic sensor,
wherein an area of said flexible printed circuit board where said first magnetic sensor is mounted is locked with respect to said magnetic sensor-holding section in a manner movable in the first direction in a state restricted in movement in the second direction, and
wherein said first magnetic sensor is held on said magnetic sensor-holding section in a manner movable in the second direction in a state restricted in movement in the first direction.

6. An image blur correction device capable of correcting an image blur by moving a correction lens in a first direction orthogonal to an optical axis, the image blur correction device comprising:
a sensor configured to detect a position of the correction lens in the first direction;
a circuitry substrate having said sensor mounted thereon;
a first restriction section configured to restrict movement of said sensor; and
a second restriction section configured to restrict movement of said substrate,
wherein said first restriction section restricts movement of said sensor in the first direction more than movement of said sensor in a second direction orthogonal to the optical axis and the first direction, and
wherein said second restriction section restricts movement of said substrate in the second direction more than movement of said substrate in the first direction.

7. The image blur correction device according to claim 6, wherein said first restriction section positions said sensor in the first direction.

8. The image blur correction device according to claim 7, wherein said second restriction section positions said substrate in the second direction.

9. The image blur correction device according to claim 6, wherein the image blur correction device is capable of correcting an image blur by moving the correction lens in the second direction,
wherein the image blur correction device further comprises:
(1) a second sensor configured to detect a position of the correction lens in the second direction, and
(2) a third restriction section configured to restrict movement of said second sensor, and
wherein said third restriction section restricts movement of said second sensor in the second direction more than movement of said second sensor in the first direction.

10. The image blur correction device according to claim 9, wherein said substrate has said second sensor mounted thereon,
wherein the image blur correction device further comprises a fourth restriction section configured to restrict movement of said substrate,
wherein said fourth restriction section restricts movement of said substrate in the first direction more than movement of said substrate in the second direction,
wherein said second restriction section is disposed at a location close to said sensor, and
wherein said fourth restriction section is disposed at a location close to said second sensor.

11. The image blur correction device according to claim 6, wherein said second restriction section restricts movement of said substrate by a slot formed in said substrate in a manner elongated in the first direction more than in the second direction and a protrusion inserted in the slot.

12. An image pickup apparatus capable of correcting an image blur by moving a correction lens in a first direction orthogonal to an optical axis, the image pickup apparatus comprising:
an image sensor;
a sensor configured to detect a position of the correction lens in the first direction;
a circuitry substrate having said sensor mounted thereon;
a first restriction section configured to restrict movement of said sensor; and
a second restriction section configured to restrict movement of said substrate,
wherein said first restriction section restricts movement of said sensor in the first direction more than movement of said sensor in a second direction orthogonal to the optical axis and the first direction, and
wherein said second restriction section restricts movement of said substrate in the second direction more than movement of said substrate in the first direction.

* * * * *